2 Sheets—Sheet 1.

R. PROCTOR.
Car-Starter.

No. 212,820.    Patented Mar. 4, 1879.

WITNESSES:

INVENTOR:
Robert Proctor

2 Sheets—Sheet 2.

R. PROCTOR.
Car-Starter.

No. 212,820. Patented Mar. 4, 1879.

WITNESSES: W. H. Wilcoxon
T. D. Wilcoxon

INVENTOR: Robert Proctor

UNITED STATES PATENT OFFICE.

ROBERT PROCTOR, OF WALNUT, ILLINOIS.

IMPROVEMENT IN CAR-STARTERS.

Specification forming part of Letters Patent No. 212,820, dated March 4, 1879; application filed April 13, 1878.

*To all whom it may concern:*

Be it known that I, ROBERT PROCTOR, of Walnut, in the county of Bureau and State of Illinois, have invented a new and useful Improvement in Car-Starters, which is fully described and claimed in the following specification, reference being had to the accompanying drawings, in which—

Figure 1:
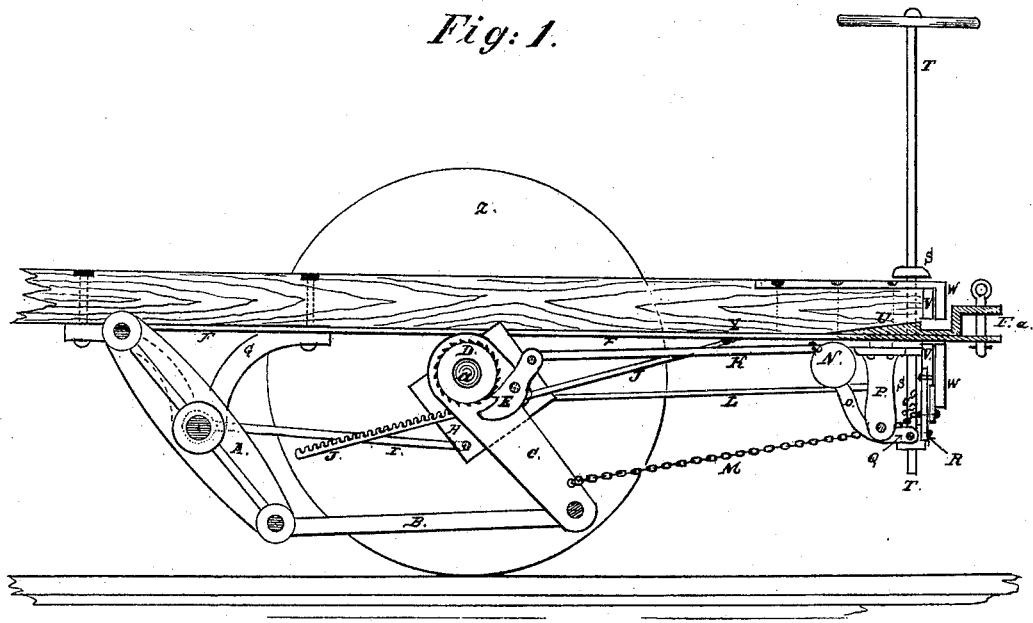
Figure 2:
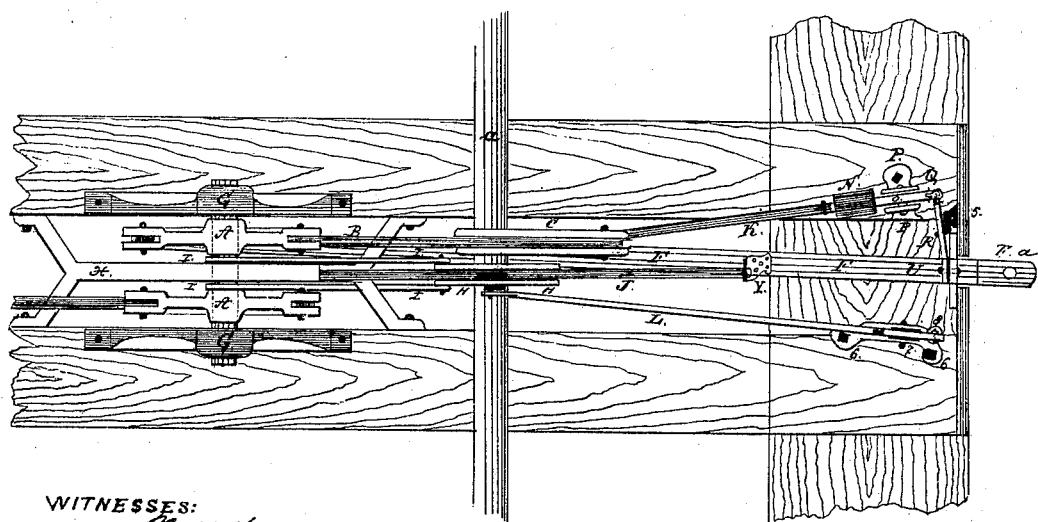
Figure 3:
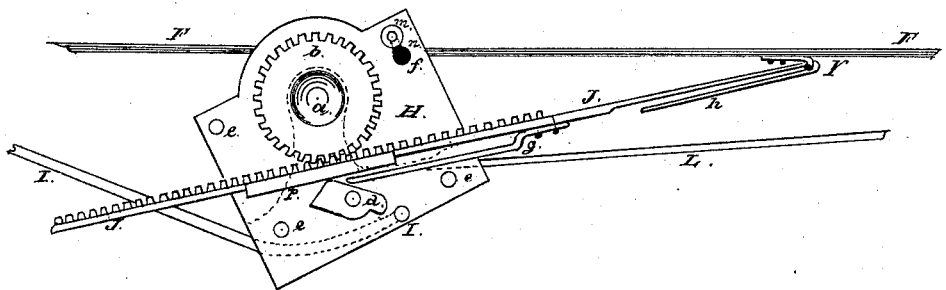
Figure 4:
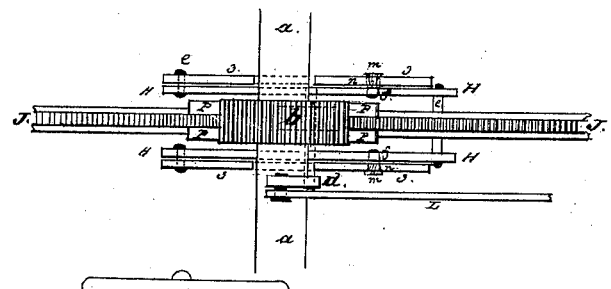
Figure 5:
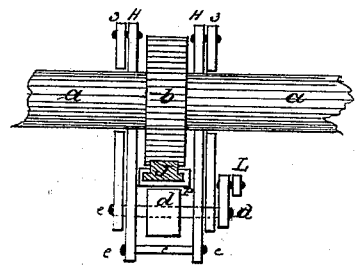
Figure 6:
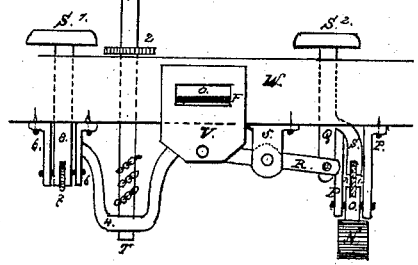
Figure 7:
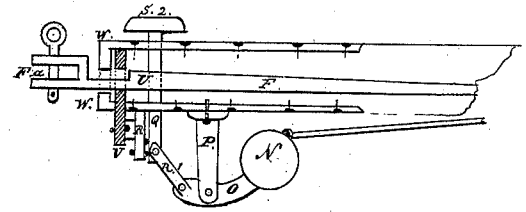

Figure 1 represents a longitudinal section of a car with my improvement applied; Fig. 2, a bottom-plan view of the same; Fig. 3, sectional view of a take-up apparatus; Fig. 4, a plan view of the take-up; Fig. 5, an end view of the same; Fig. 6, an end elevation of the car as shown in Fig. 1, and Fig. 7 a cross-section of the same.

My invention relates to mechanism designed especially for application to cars, and arranged so that the draft at starting is applied to the axle through levers, whereby power is gained, for the purpose of more easily setting the car in motion.

The invention consists in certain combinations of special devices, all of which will be hereinafter fully described, and pointed out in the claims.

In the drawings, a car of ordinary construction is represented with my improved starting mechanism applied. The car is provided with a sliding draw-bar, F, to which the draft is attached, and which is pivoted at its inner end to a lever, A, which, in turn, is pivoted near its center to a hanger or bracket, G, fastened to the under side of the car-frame, and arranged in rear of the wheels Z sufficiently far to permit the lever to vibrate without interfering with the axle or brakes.

A connecting rod or bar, B, is pivoted to the lower end of the lever A, at one end, and at the other to the lower end of a second vibrating lever, C.

The lever C is mounted at its upper end on the axle *a* loosely, and is provided with a pivoted pawl, E, which is eccentric to the axle.

A ratchet-wheel, D, is fastened to the axle *a*, and the lever C is concentric with this wheel, while the pawl E is eccentric thereto. The lever may be made to embrace the wheel, as shown in the drawings, or constructed in any other way adapting it to its purpose. For instance, it may be made in the shape of a circle or wheel, in which case it is to be operated by a chain or pawl; and the lever A may also be of similar form, and operated in like manner.

The pawl E is arranged to vibrate freely on its pivot, and engages at the proper movement of the lever C with the ratchet-wheel D, thereby communicating motion to the latter and turning the axle.

The lower end of the pawl is weighted, so that it will fall away from the ratchet-wheel when released. The pawl is caused to engage with the ratchet-wheel by means of a rod, K, fastened to its upper end, and extending forward to a vibrating lever, N, pivoted to a bracket, P, underneath the platform of the car. This lever is curved or angular, so that when the forward end is depressed the rear end moves upward and forward, thereby making a forward pull on the rod K, which vibrates the pawl and causes it to engage with the wheel D.

The forward end of the lever N is pivoted to the lower end of a foot-lever or pedal, S, which passes up through the platform within easy reach of the attendant, and the rear end of said lever is weighted, so as to fall back when released, thereby assisting to release the pawl.

Now, it is evident that when the pawl is engaged with the ratchet-wheel on the axle and the sliding draw-bar is released, the latter will be pulled forward independently, thereby producing a backward pull on the lower end of the lever C, which brings a strong leverage to bear on the ratchet-wheel, starting its rotation, and with it the axle and wheels.

It is necessary to provide some device for holding and releasing the draw-bar. This I effect by means of a pivoted lever, R, underneath the platform, which is hinged at one end to a stop-plate, V, which is arranged to slide vertically in a suitable keeper in the head-piece W. The upper end of the stop is slotted, and the draw-bar passes through it, and is provided with a shoulder, U, arranged just behind the sliding plate V when the draw-bar is in its normal position, in which case the upper part of the plate drops in front of the shoulder U and holds the draw-bar in proper place. When, however, the plate V is thrown up, the draw-bar will be released, and may then be pulled forward independently of the car to operate the starting mechanism. To effect this release I pivot one end of the lever R to the pedal-bar S, so that when the latter is depressed to cause the pawl to engage with the ratchet-wheel the stop-plate is simultaneously moved upward, thereby releasing the draw-bar. After the car is started the draw-bar must be retracted. This is effected by means of a chain fastened to the lower end of the lever C, and running forward to an upright shaft, T, provided with a crank above the platform. The turning of this shaft will, of course, wind the chain upon it, thereby pulling forward the lever C and retracting the draw-bar F. The stop-plate V will, at the proper time, drop down in front of the shoulder U, being inclined backward to permit it to slide back under the plate.

I have also shown a self-acting device for effecting this same result. A cog-bar, J, is provided, which, at its forward end, is linked loosely into an eye, Y, on the draft-bar, and permitted to move loosely back and forth in the eye. This bar extends back through a keeper suspended from the axle, on which, just over the bar, is a pinion, b. A cam is attached to a rock-shaft arranged underneath the cog-bar, at the other end of which is a crank, d, connected by a rod, L, to a lever underneath the platform, which is connected to a second pedal-bar, S', by means of which the crank is vibrated to throw up the cam, thereby raising the cog-bar and causing it to engage with the pinion on the axle. This is done after the car is started, when it is evident that the revolution of the axle will draw back the bar J, and thereby retract the draw-bar. The cog-bar and pinion are designed at the proper moment, either by releasing the pedal or by attaching a suitable stop to the lower side of the bar, to turn the cam downward at the proper time and permit the cog-bar to drop.

It will be noticed that the cog-bar is drawn forward with the draw-bar, and in turn retracts the latter when it is pulled back by the operation of the pinion.

My improvement is designed, as stated above, especially for cars, and more particularly horse-cars; but it is also applicable to vehicles of other descriptions, and may be used with advantage on ordinary wagons which are heavily loaded.

Having thus described my invention, what I claim as new, and desire to secure by Letters Patent, is—

1. In a car-starter, a ratchet-wheel on the axle, in combination with a lever mounted loosely on said axle at its upper end, a pawl pivoted to said lever eccentrically to the axle, and an auxiliary lever, connected at one end to the free end of the pawl-lever, and at its other end to a sliding draw-bar, substantially as described.

2. The pawl-lever pivoted on the axle, in combination with the auxiliary lever, connecting-rod uniting the two, sliding draw-bar attached to the auxiliary lever, and retracting mechanism for pulling back the draw-bar, substantially as described.

3. The sliding draw-bar F, in combination with the vibrating lever A, connecting-rod B, pawl-lever C, chain M, and crank-shaft T, whereby the draw-bar is retracted and pawl-lever swung forward by the same mechanism, substantially as described.

4. The ratchet-wheel on the axle, in combination with the swinging pawl-lever C, pawl E, pivoted thereto, and weighted lever N, connected to the pawl, whereby the latter is disengaged from the ratchet automatically, substantially as described.

5. A pedal, S, in combination with mechanism for vibrating the pawl, and mechanism for stopping and releasing the sliding draw-bar, both connected to the pedal and operated by the same movement thereof, substantially as described.

6. The sliding draw-bar F, provided with a stop, U, in combination with the slotted stop-slide V, lever R, and pedal S, substantially as described.

7. The pawl E, pivoted as described, in combination with the weighted lever N, connecting-rod K, and pedal S, substantially as and for the purpose set forth.

8. The pedal S, in combination with the weighted lever N, connecting-rod K, pawl E, lever R, stop-slide V, and draw-bar F, substantially as and for the purpose set forth.

ROBERT PROCTOR.

Witnesses:
M. H. WILCOXON,
T. D. WILCOXON.